United States Patent Office 2,849,217
Patented Aug. 26, 1958

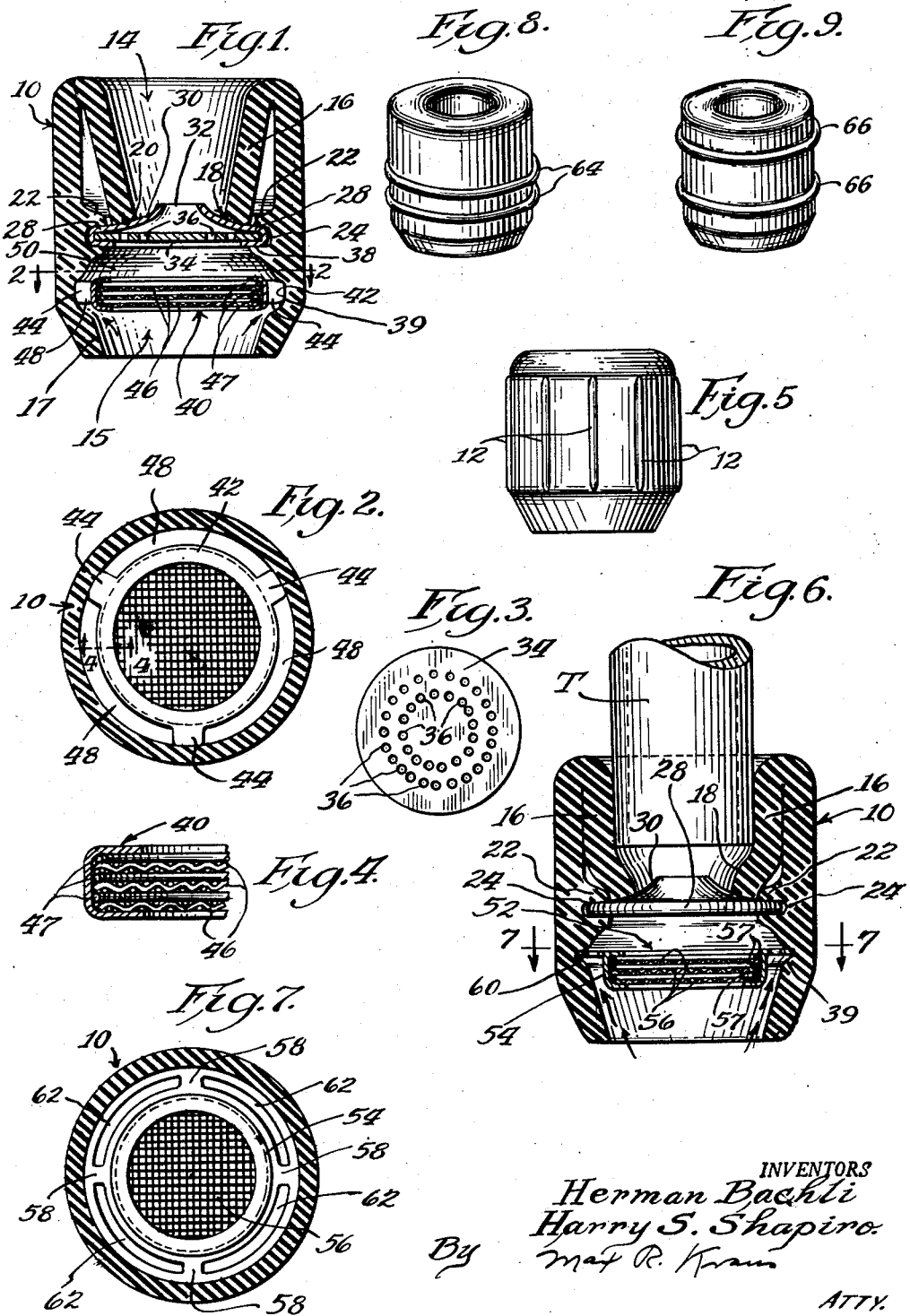

2,849,217

AERATORS

Herman Bachli and Harry S. Shapiro, Chicago, Ill., assignors to Chicago Specialty Manufacturing Co., Chicago, Ill., a corporation of Illinois Application August 13, 1954, Serial No. 449,578

3 Claims. (Cl. 261—76)

This invention relates to an aerating device and more particularly to an aerator for use with a water faucet.

One of the objects of this invention is to provide an aerator in which the air is drawn in through the outlet or discharge opening of the device which thereby eliminates the possibility of the discharged liquid from ever discharging through the sides of the casing. The prior art constructions provide air openings in the sides of the casing which feature is objectionable in that if the foraminous or screen member becomes clogged or if a utensil is positioned directly adjacent the outlet of the device, the liquid will discharge through the side air openings and spray laterally in all directions. This objectionable feature is eliminated with this invention.

Another of the objects of this invention is to provide an aerator casing which may be molded as a one piece structure and where the internal parts are readily inserted and held in position by the structure of the casing.

Another object is to provide an aerator which if a utensil or other object is placed against the outlet opening, the outlet will be blocked and the liquid will be kept from passing out through any portion of the aerator.

Another object is to provide an aerator in which the casing has no side air openings and in which the foraminous or screen member is positioned in the casing so that air openings are provided between the foraminous member and the inner wall of the casing whereby the air is drawn in through the outlet opening.

Another object is to provide an aerator having a spray jet unit which increases the pressure of the liquid entering the aerator and which aerator is provided with a foraminous or screen member spaced from the inner wall of the casing to permit the air to enter into the mixing chamber from the outlet end of the aerator, which features combine to break up the liquid in the aerator and produce a discharged liquid which is soft and of fine bubbles, milky-like in appearance and which remain as bubbles for a period of time before breaking up.

Another object is to provide an aerator with a casing having reinforcements for strengthening same.

Other objects will become apparent as this description progresses.

In the drawings:

Fig. 1 is a longitudinal cross sectional view of the aerator.

Fig. 2 is a view partly in cross section taken on lines 2—2 of Fig. 1 and showing a top plan view of the foraminous or screen member.

Fig. 3 is a plan view of the disc or diaphragm of the spray jet unit.

Fig. 4 is an enlarged fragmentary section taken on lines 4—4 of Fig. 2.

Fig. 5 is an elevational view of the preferred form of casing of the aerator.

Fig. 6 is a longitudinal cross sectional view of the aerator but showing another form of foraminous or screen member.

Fig. 7 is a cross sectional view taken on lines 7—7 of Fig. 6, and

Figs. 8 and 9 are modified forms of casings for the aerator with different forms of ribs or reinforcing members.

Referring particularly to Figs. 1 to 5 of the drawings, there is shown one embodiment of the invention. The casing 10 is made of one piece of material preferably rubber or a similar resilient material. The casing is generally cylindrical in form and is provided on the outside thereof with a plurality of spaced vertical ribs 12 which provide rigidity and reinforcement to the casing, as well as a gripping surface. The upper end of the casing is the inlet 14 defined by an inturned portion 16 which tapers inwardly to a reduced circumference 18 and which is slipped over the open end of a water faucet or tap T as best shown in Fig. 6 to secure the casing thereon. The opposite end of the casing designated by the numeral 15 is the outlet end. The end 20 of the inturned portion extends below the top of the circumferential bead or rib generally designated by the numeral 22 which is formed on the inside of the casing 10 and which extends inwardly of the inside wall of the casing.

The bead or rib 22 is provided with a circumferential recess or channel 24 which receives and retains the spray jet unit generally designated by the numeral 26. The spray jet unit 26 comprises a funnel shaped canopy 28 which flares upwardly as at 30 and is provided with a restricted inlet opening 32 which is in alignment with the longitudinal axis of the casing 10. The canopy member 28 has secured thereto a flat disc or diaphragm 34 provided with a plurality of spaced small openings 36 arranged in a pair of spaced circles.

The lower end of the canopy is crimped inwardly at the bottom as at 38 to lock the disc 34 thereto. It will be seen that the top of the canopy member 28 is spaced from the disc 34 with the spacing increasing gradually to the greatest distance adjacent the opening 32. The liquid from the tap T enters the central restricted inlet opening 32 of the nozzle 26 and passes through the openings 36 in the disc 34. The spray jet unit increases the pressure of the liquid entering same and it is discharged through the disc 34 in a very fine stream or spray.

The end 20 of the inturned portion 16 rests on the top of the canopy 28 as shown to more positively prevent the nozzle from being displaced in the recess 24. When the aerator is secured to the tap T the inturned portion 16 is positioned as shown in Fig. 6 with the major portion of same moved to a vertical position against the vertical wall of the casing and the lower end of the inturned portion 16 curved inwardly against the circumferential rib 22 and on top of the canopy 28.

The inner wall of the casing is also provided with another circumferential recess 39 spaced from the first recess, which is adapted to receive the foraminous or screen member generally designated by the numeral 40. The foraminous or screen member 40 one form of which is shown in Figs. 1 and 2 comprises an annular channel member 42 having a plurality (3 being shown) of spaced lugs 44 radiating from the channel member. Confined within the channel member 42 as best seen in Fig. 1 are a plurality of discs 46 of metal screen or other suitable foraminous material, which spacedly overlie each other and have their edges secured and confined within the channel member. The screens 46 are spaced from each other by rings 47. In the present instance 3 metal screens are shown, although a different number may be used. The foraminous or screen member 40 is positioned in the casing so that the projections or lugs 44 are confined in the annular recess 39, thus providing a plurality of spaced arcuate shaped openings 48 (3 being shown) between the inner wall of the casing and the outer peripheral edge of the channel member 42. These openings permit the air to enter upwardly through the outlet end 15 of the casing and into the mixing chamber designated by the numeral 50 which chamber is between the spray jet unit 26 and the foraminous or screen member 40. When liquid under pressure as from a water faucet passes through the casing the air is drawn in and upwardly through the outlet opening 15 of the casing and through the spaces or openings 48 into the mixing chamber 50 before the liquid passes through the foraminous or screen member 40. The outlet end of the casing tapers inwardly as indicated at 17.

After the liquid leaves the spray jet unit 26 in a fine stream or spray it mixes with the air in the mixing chamber 50 and the liquid spray impinges on the screens 46 which further break up the spray and produces a liquid discharged through the outlet 15 which is comprised of fine bubbles, milky-like in appearance having a soft and velvet-like feeling. It will be seen that if the bubbles are allowed to flow on a person's hand that the bubbles will remain as bubbles for a period of time before breaking up.

In the construction shown in Figs. 6 and 7 the casing 10 and the spray jet unit 26 are the same as previously described. In this modification the foraminous or screen member has been modified and same will now be described. The modified foraminous or screen member generally designated by the numeral 52 comprises an annular inner channel member 54 in which is confined the screens 56 in spaced overlying relation and which have their edges secured and confined within the top and bottom flanges of the channel member. The rings 57 space the screens 56 from each other. A plurality of spaced lugs 58 radiate from the channel member adjacent the top thereof and are connected with a ring member 60. The ring member 60 is secured and confined within the annular recess 39 with the channel member 54 and screens 56 extending downwardly therefrom. A plurality of arcuately shaped slots 62 (4 being shown) are provided between the outer peripheral edge of the channel member 54 and the inner wall of the ring 60 and these slots are the air openings which serve the same purpose as the air openings 48 described in Figs. 1 and 2. The operation and the results of the construction shown in Figs. 6 and 7 is the same as that previously described.

Figs. 8 and 9 show modified forms of outer wall of casings that may be used. These casings are similar to that described previously except that in Fig. 8 the outer wall is provided with a pair of spaced annular ribs 64 positioned from midway of the length of the casing, while in Fig. 9 the annular ribs 66 are spaced so that they are adjacent the top and the bottom of the vertical wall section of the casing. The ribs shown in Figs. 5, 8 and 9 serve to strengthen the casing and also provide a means for manually gripping same when installing and removing the aerator.

With this invention it will be seen that if the foraminous or screen members 40 or 52 become clogged and block the passage of the liquid the liquid may pass through the openings 48 or 62 and would not squirt up and out as in the prior art construction in which the air openings are provided in the sides of the casing. Furthermore if the outlet opening 15 is completely sealed or blocked as by the placing of a utensil directly against the outlet opening the liquid would be blocked from coming out, but would not squirt out through the side openings of the casing as in the prior art aerators.

The aerator may be readily disassembled and cleaned in a minimum of time and with minimum effort.

It will be understood that various changes and modifications may be made from the foregoing without departing from the spirit and scope of the appended claims.

We claim:

1. A device for aerating a liquid under pressure comprising a one piece casing having single inlet and outlet portions, said casing being closed except for said single inlet and outlet portions, said inlet portion being adapted to be supported on the end of the faucet through which liquid may flow, a spray jet unit in said casing including a conical shaped canopy having an inlet opening and an apertured disc secured thereto below said canopy, a foraminous member adjacent the casing outlet including a plurality of superimposed foraminous discs, means for supporting said foraminous member in said casing, said foraminous member having a circumference less than the inner wall of the casing adjacent said foraminous member to space the periphery of said foraminous member from said inner wall of the casing to provide enlarged interior air inlets between the periphery of the foraminous member and the inner wall of the casing for permitting entry of air solely upwardly into the casing through said single outlet.

2. A device for aerating a liquid under pressure comprising a casing having single inlet and outlet portions, said casing being closed except for said single inlet and outlet portions, said inlet portion being adapted to be supported on the end of the faucet through which liquid may flow, a spray jet unit in said casing including a conical shaped canopy having a restricted inlet opening and an apertured disc secured thereto and below said canopy, a foraminous member positioned below said spray jet unit including a foraminous disc secured within a supporting member, said supporting member having projecting members for securing said foraminous member to said casing in spaced relation to the inner wall of said casing for providing enlarged interior air inlets between the foraminous member and the inner wall of said casing for permitting entry of air solely upwardly into the casing through said single outlet portion.

3. A device for aerating a liquid under pressure comprising a casing having single inlet and outlet portions, said casing being closed except for said single inlet and outlet portions, said casing having an inturned member adjacent said inlet portion and adapted to be secured on the end of the faucet through which liquid may flow, a spray jet unit in said casing including a conical shaped canopy having a central inlet opening and an apertured diaphragm with the inturned member resting on said canopy, a screen member in said casing positioned below said spray jet unit in spaced relation to the inner wall of the casing to provide a plurality of enlarged interior air openings between it and the inner wall of the casing for permitting entry of air solely upwardly into the casing through said single outlet.

References Cited in the file of this patent

UNITED STATES PATENTS

| | | |
|---|---|---|
| 2,316,135 | Turek et al. | Apr. 6, 1943 |
| 2,382,066 | Klein | Aug. 14, 1945 |
| 2,487,023 | Lehmann | Nov. 1, 1949 |
| 2,664,278 | Aghnides | Dec. 29, 1953 |
| 2,675,218 | Bletcher et al. | Apr. 13, 1954 |